United States Patent
Shimokawatoko et al.

(10) Patent No.: US 7,113,813 B2
(45) Date of Patent: Sep. 26, 2006

(54) MOBILE COMMUNICATION TERMINAL AND ELECTRO-ACOUSTIC TRANSDUCER USED FOR THE SAME

(75) Inventors: Takeshi Shimokawatoko, Mie (JP); Shigeru Tomoeda, Mie (JP); Koji Sano, Mie (JP); Tetsuya Mori, Mie (JP); Kazutaka Kubo, Mie (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 384 days.

(21) Appl. No.: 10/363,683

(22) PCT Filed: Jul. 10, 2002

(86) PCT No.: PCT/JP02/06988

§ 371 (c)(1),
(2), (4) Date: Jul. 29, 2003

(87) PCT Pub. No.: WO03/007651

PCT Pub. Date: Jan. 23, 2003

(65) Prior Publication Data

US 2004/0043801 A1   Mar. 4, 2004

(30) Foreign Application Priority Data

Jul. 11, 2001  (JP) .............................. 2001-210438
Mar. 26, 2002  (JP) .............................. 2002-085260

(51) Int. Cl.
*H04M 1/00* (2006.01)
*H04R 25/00* (2006.01)
*H04R 1/02* (2006.01)
*G10K 11/00* (2006.01)

(52) U.S. Cl. .............................. 455/575.3; 455/550.1; 455/569.1; 455/575.1; 381/150; 381/335; 381/345; 181/189; 379/433.02

(58) Field of Classification Search ............. 455/550.1, 455/575.3, 575.8; 381/334, 335, 337, 338, 381/345–354; 181/182, 189, 190, 194
See application file for complete search history.

(56) References Cited

U.S. PATENT DOCUMENTS

| | | | |
|---|---|---|---|
| 6,377,827 B1 * | 4/2002 | Rydbeck | 455/575.3 |
| 6,472,797 B1 * | 10/2002 | Kishimoto | 310/324 |
| 2002/0052216 A1 * | 5/2002 | Song | 455/550 |
| 2003/0003879 A1 * | 1/2003 | Saiki et al. | 455/90 |

FOREIGN PATENT DOCUMENTS

| | | |
|---|---|---|
| EP | 1 091 539 | 4/2001 |
| JP | 3-59739 | 6/1991 |

(Continued)

*Primary Examiner*—George Eng
*Assistant Examiner*—Michael Thier
(74) *Attorney, Agent, or Firm*—Wenderoth, Lind & Ponack, L.L.P.

(57) ABSTRACT

A portable communication terminal employs an electro-acoustic transducer having openings on the housing. The openings of the transducer are coupled to a housing of the terminal or acoustic pipes unitarily formed with the housing of the transducer. An opening of the acoustic pipe faces an opening provided in the housing of the terminal. The terminal uses a transducer including a diaphragm, a cover closely jointed to an outer periphery of the diaphragm and facing a front face of the diaphragm, and a frame provided at a rear face of the diaphragm. The terminal and the transducer consume less power and yet radiate greater output sound pressure with smaller bodies. They can deliver sound from a display section, so that a user accepts the sound normally.

7 Claims, 12 Drawing Sheets

FOREIGN PATENT DOCUMENTS

| | | |
|---|---|---|
| JP | 6-244912 | 9/1994 |
| JP | 9-289538 | 11/1997 |
| JP | 11-68900 | 3/1999 |
| JP | 2001-157288 | 6/2001 |
| JP | 2002-77346 | 3/2002 |

* cited by examiner

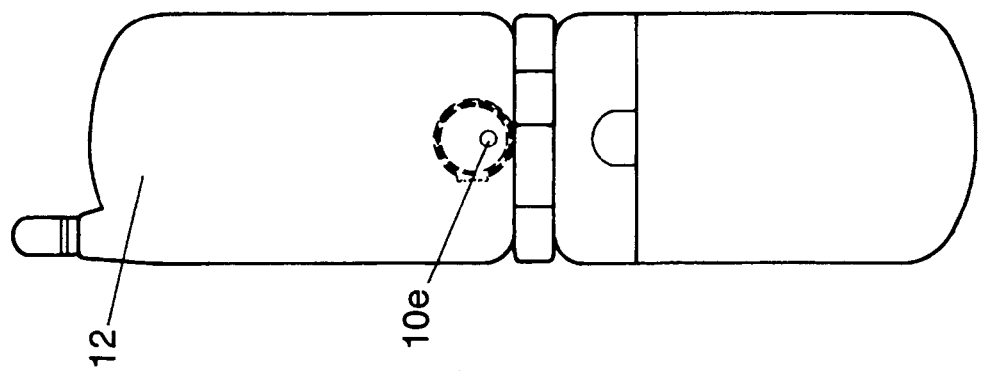
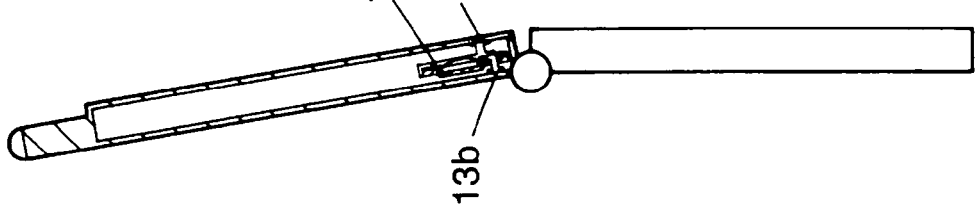
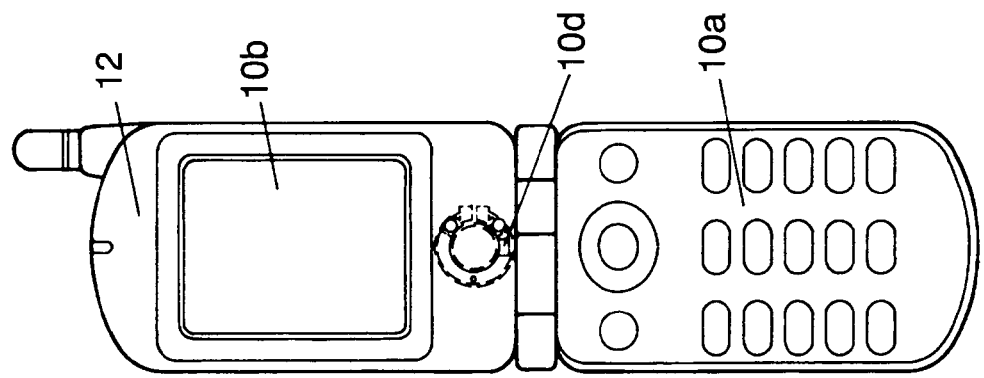

FIG. 9(a)
FIG. 9(b)
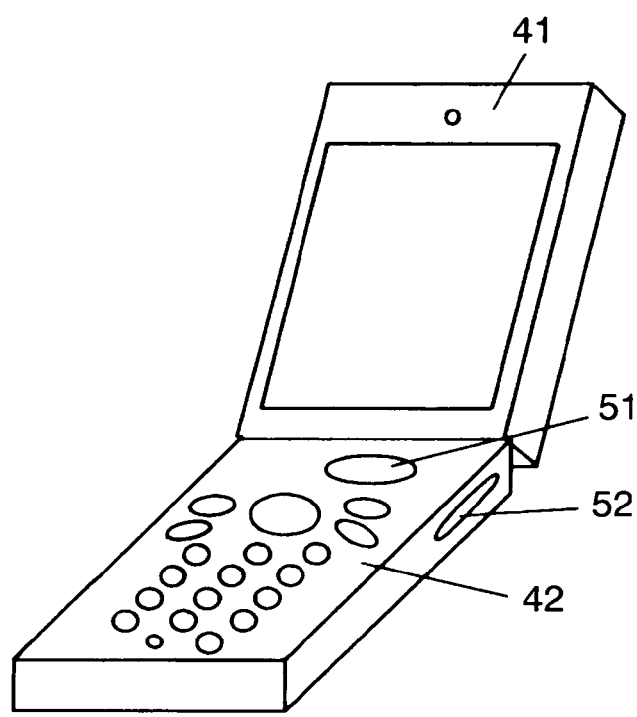
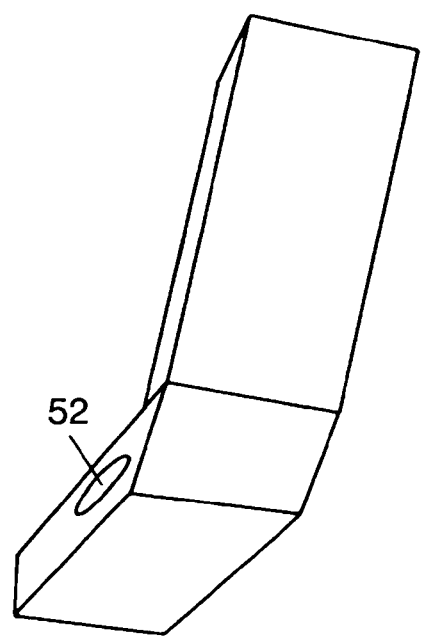

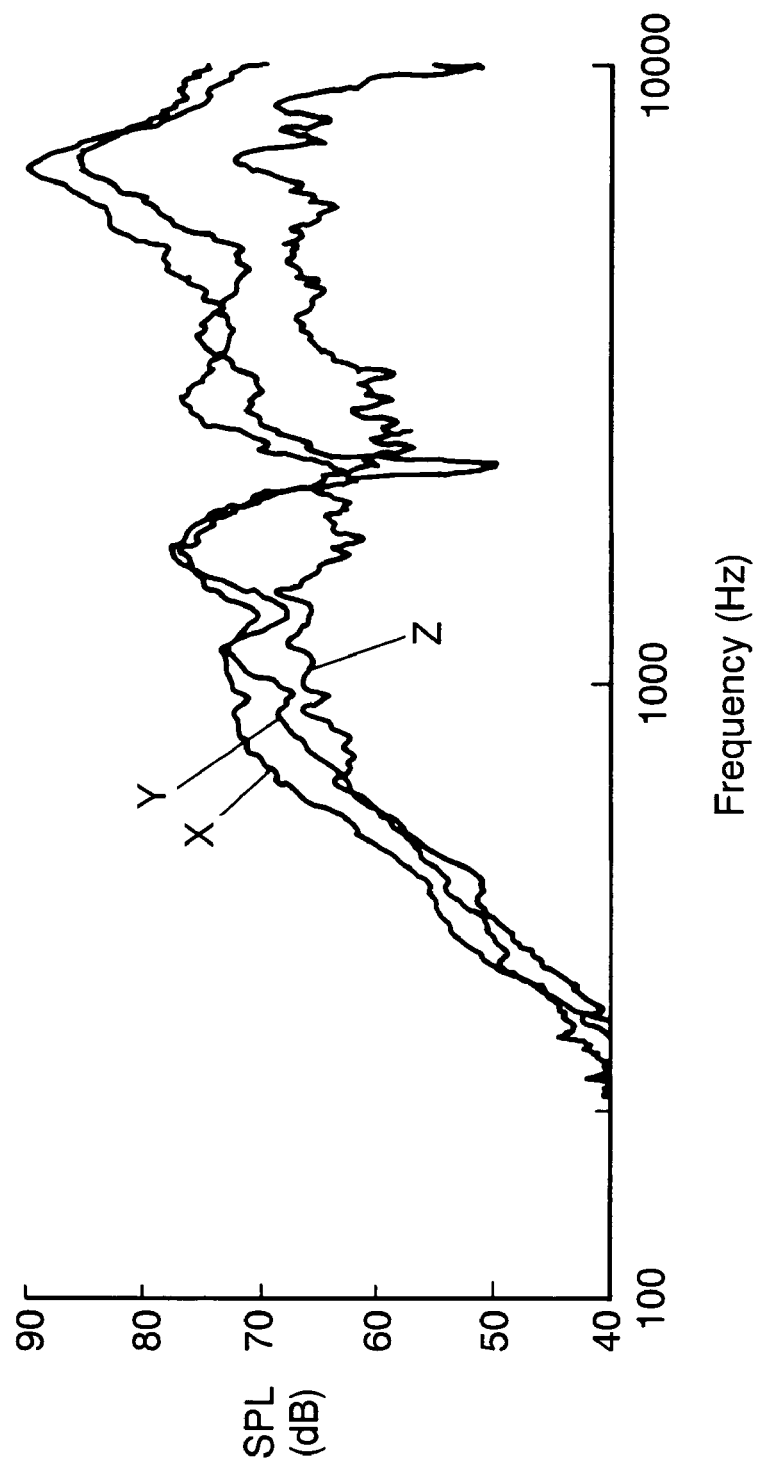

MOBILE COMMUNICATION TERMINAL AND ELECTRO-ACOUSTIC TRANSDUCER USED FOR THE SAME

TECHNICAL FIELD

The present invention relates to portable communication terminals such as a portable telephone, a personal handyphone system (PHS), or a portable computer employing a communication modem therein. The present invention also relates to an electro-acoustic transducer (hereinafter referred to as a transducer) to be used in the same portable communication terminals.

BACKGROUND ART

A conventional portable communication terminal is described with reference to FIGS. 11 (a), 11 (b), 11 (c) and FIG. 12 which illustrate a portable telephone. FIG. 11(a) is a front view of the portable telephone in use. FIG. 11(b) is a side view of the same including a partial sectional view. FIG. 11(c) is a rear view of the same. FIG. 12 is a side sectional view of a transducer incorporated in the portable telephone.

In FIG. 11(a), on the front face of portable telephone 10, operating section 10a including pushbutton digits is prepared, and a transmitter (not shown) is also provided to the front face. Display section 10b including a liquid crystal display is disposed on an upper part of the front face, and a receiver (not shown) is provided to this upper part. In FIG. 11(c), opening 10c is provided on the rear face and guides the sound generated by transducer 11 to the outside.

A structure of transducer 11 is described with reference to FIG. 12. Circular diaphragm 1 generating aerial vibration is supported by frame 2 at its outer periphery with adhesive. Frame 2 includes a plurality of first sound-paths 2a. An end of voice coil 3 is rigidly fixed to a center portion of diaphragm 1, and both the ends of voice coil 3 are electrically coupled to terminal section 4 disposed at a lower end portion of frame 2.

A magnetic circuit formed of magnet 5, top plate 6 and yoke 7 is disposed in a recess provided at a center of frame 2. Voice coil 3 is inserted in a space (magnetic gap) between the outer periphery of top plate 6 and the inner wall of yoke 7.

Protector 8, to which second sound-paths 8a are provided, protects diaphragm 1, and forms a housing of the transducer together with frame 2. The foregoing portable telephone thus radiates only the sound delivered from second sound-paths 8a provided to protector 8 to the outside. On the other hand, the sound delivered from first sound-paths 2a provided to frame 2 is radiated within portable telephone 10. For that purpose, protector 8 is bonded to the inner wall of phone 10 via a spacer, so that transducer 11 is mounted in phone 10. This structure allows the sound delivered from first sound-paths 2a and the sound from second sound-paths 8a of protector 8 to be separated and free from interference.

The portable telephone has changed its function drastically from a telephone to an information terminal these days. This change entails the following requirements from the market: more sophisticated performances of the display such as a larger and color display, and better characteristics on an output sound-pressure from the display side as an interactive device. Further, a display of portable communication terminals such as portable telephones accompanies sound more often, such as reproduced sound of a video game, or a tone verifying a operation of pushed buttons.

Under these circumstances, reproduced sound by a conventional transducer or a conventional mounting structure of the transducer in operating the display lowers a directivity toward the front side of the communication terminal due to diffraction effect, because the sound is delivered only from second sound-paths 8a. Thus, sufficient volume and quality of sound cannot be expected to the front side of the portable telephone. The present invention aims to provide a portable communication terminal that overcomes the foregoing problems.

SUMMARY OF THE INVENTION

A portable communication terminal of the present invention uses a transducer having an opening formed on a housing thereof. The opening of the transducer is coupled to an acoustic pipe unitarily formed (i.e., formed as one piece) with the housing of the communication terminal or the housing of the transducer. An opening of the acoustic pipe faces an opening provided in the housing of the communication terminal. The portable communication terminal of the present invention includes a cover and a frame, which are brought into close contact with the outer periphery of a diaphragm, on a front face and a rear face of the diaphragm, respectively. The terminal uses a transducer including at least two openings on the cover and the frame. A transducer used in an embodiment of the present invention has at least two conduits, such as openings or acoustic pipes, on either one of the frame or the cover. A transducer used in another embodiment of the present invention includes at least one conduit, such as the opening or the acoustic pipe, on the frame and includes the remaining conduit on the cover. The areas of respective openings provided to the cover and the frame are approximately equal to each other.

BRIEF DESCRIPTION OF THE DRAWINGS

FIG. 1(a) is a front view of a portable telephone in use as an embodiment of a portable communication terminal of the present invention.

FIG. 1(b) is a partially sectional side view of the portable telephone shown in FIG. 1(a).

FIG. 1(c) is a rear view of the same portable telephone.

FIG. 9(a) is a perspective view of yet another modification.

FIG. 9(b) is a perspective rear view of the same.

FIG. 10 is a graph illustrating the characteristics of sound pressure level vs. frequency of the modification shown in FIG. 9.

DETAILED DESCRIPTION OF THE INVENTION

An embodiment of the present invention is described using a portable telephone as an example with reference to the accompanying drawings. Similar elements to those described in the background art have the same reference marks, and the descriptions thereof are omitted here.

First Exemplary Embodiment

Figure 2:
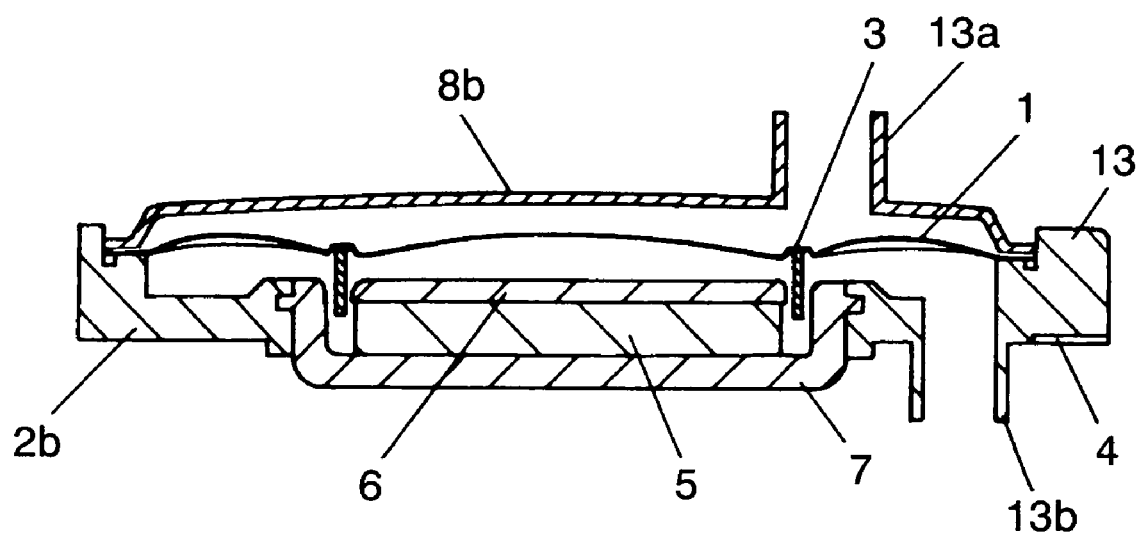
FIG. 2 is a side sectional view of a transducer to be used in the portable telephone shown in FIGS. 1(a)–1(c).
Figure 3:
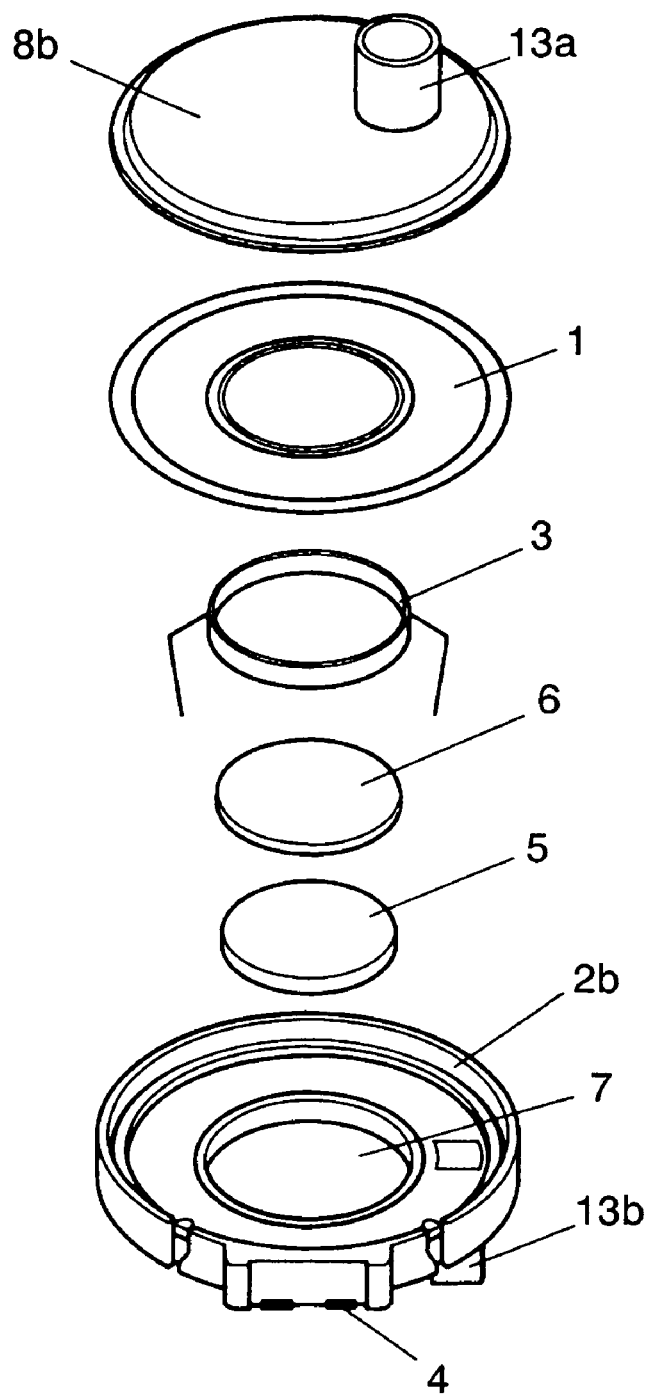
FIG. 3 is an exploded perspective view of the transducer.

FIG. 1(a) is a front view of a portable telephone in use as an embodiment of a portable communication terminal of the present invention. FIG. 1(b) is a partially sectional side view of the same. FIG. 1(c) is a rear view of the same. FIG. 2 is a side sectional view of a transducer incorporated in the portable telephone shown in FIGS. 1(a)–1(c). FIG. 3 shows a perspective exploded view of the transducer.

In FIG. 1(a) through FIG. 3, first opening 10d is provided in display section 10b of portable telephone 12, and second opening 10e is provided in a rear side of display section 10b. Transducer 13 built in portable telephone 12 includes second acoustic pipe 13b, which delivers sound from transducer 13 through first opening 10d, and first acoustic pipe 13a, which also delivers sound from transducer 13 through second opening 10e.

In the present embodiment, as shown in FIG. 3, first acoustic pipe 13a is unitarily molded (i.e., molded as one piece) with protector (cover) 8b which covers a diaphragm, when protector 8b is molded of resin. Second acoustic pipe 13b is unitarily molded (i.e., molded as one piece) with frame 2b when frame 2b is resin molded.

The acoustic pipes are not necessarily molded with protector 8b and frame 2b simultaneously. However, molding at the same time results in lowering the cost. Acoustic pipe sections can be molded at a time when the housing of phone 12 is molded, and the openings are provided to the first and second acoustic pipe sections of transducer 13.

Figure 12:
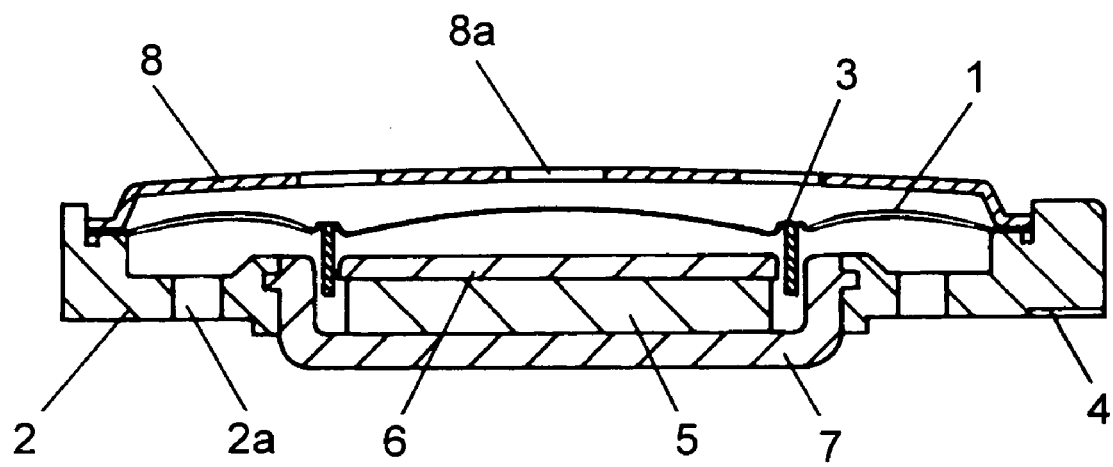
FIG. 12 is a side sectional view of a conventional transducer used in the conventional portable telephone.

As shown in FIG. 12, conventional transducer 11 has sound-paths 2a in frame 2. However, since a magnetic circuit is mounted to frame 2, there is not enough space for sound-paths 2a. As a result, sound-paths 2a only have minimal opening areas so as not to restrict diaphragm 1 from vibrating, and to decrease the sound radiation from sound-paths 8a of protector 8. In the present embodiment, on the other hand, an opening area of first acoustic pipe 13a and an opening area of second acoustic pipe 13b are nearly equal, so that an audible difference detected by users can be suppressed. Further, since there are no restrictions such as in the conventional transducer, acoustic pipes 13a and 13b can have larger opening areas and can radiate the sound from transducer 13 to the outside efficiently. As a result, a greater sound volume can be expected.

First acoustic pipe 13a and second acoustic pipe 13b are placed symmetrically with respect to diaphragm 1, so that diaphragm 1 is prevented from rolling when it is driven.

Transducer 13 structured as described above radiates respective sounds from first opening 10d and second opening 10e with 180 degrees phase difference (anti-phase). In other words, this is because acoustic pipes 13a and 13b are provided, respectively, to the front face and the rear face of diaphragm 1. Therefore, around the side faces of the portable telephone, where the sounds from both of the acoustic pipes diffuse and clash with each other, the sounds radiated interfere with each other and attenuate to suppress sounds. On the other hand, in front of the portable telephone, where a user actually needs the sound, efficiently loud sound can be heard.

When portable telephone 12 is folded and carried in a user's pocket, second acoustic pipe 13b is covered by operating section 10a. Thus, the sound radiated from first acoustic pipe 13a open to the rear face performs paging. In this case, an efficiently loud sound can also be heard similar to the sound from the front face.

As discussed above, the portable communication terminal of the present invention radiates loud sound in a direction where the sound is needed, and restricts sound radiation along side faces of a portable telephone where essentially the sound is not needed.

In the present embodiment, a single transducer 13 radiates the sound through first acoustic pipe 13a and second acoustic pipe 13b, then from both of the front and rear faces of portable telephone 12. This structure thus can downsize portable telephone 12. To be more specific, when conventional portable telephone 10 radiates sound from both of the front face and the rear face (i.e., either of the main faces), and yet it restricts the sound from radiating in other directions (namely, when the conventional phone aims only to improve directivity from the front and rear faces), different transducers are independently used for radiating the sound from the front face and the rear face (the main faces). In this case, sound signals supplied to the respective transducers have 180 degrees phase-difference from each other. In fact, this structure can achieve the present objective. However, the conventional phone needs two transducers, makes the circuit complicated and requires more power, i.e., a larger battery. The present embodiment can overcome those problems.

Transducer 13 used in the present embodiment has first acoustic pipe 13a on protector 8b which works as a part of the housing of transducer 13, and second acoustic pipe 13b on frame 2b which is another part of the housing. However, if a space for mounting the transducer to the portable telephone 12 is limited, alternate forms of conduits can be used. For example, conduits such as only openings instead of pipes can work well enough. Whether or not to employ the acoustic pipes or use a pipe on only either side can be determined accordingly.

The portable communication terminal in accordance with the present embodiment radiates sounds from both its front and rear faces to achieve excellent directivity. On the other hand, in other surrounding areas of the terminal, the sounds from the front and rear faces cancel each other because they have 180 degrees phase difference, so that the terminal can inhibit the sound radiation from adversely affecting the surroundings.

Second Exemplary Embodiment

Figure 4:
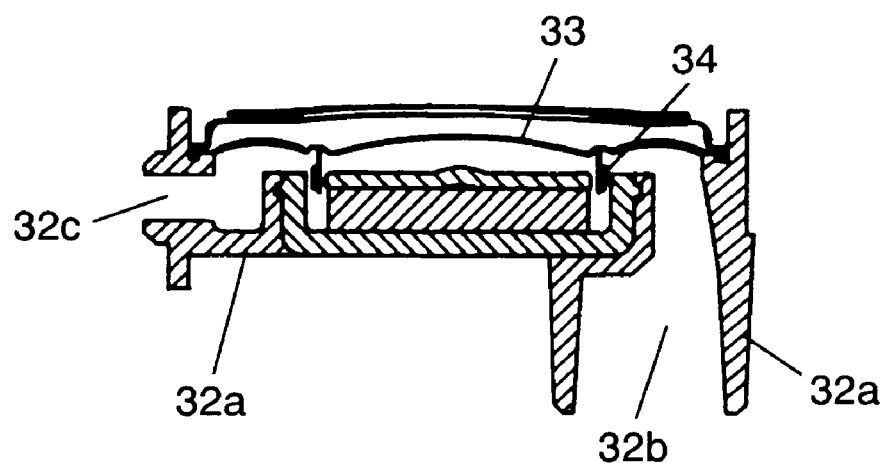
FIG. 4(a) is a side sectional view of a transducer in accordance with a second exemplary embodiment of the present invention.
FIG. 4(b) is a perspective bottom view of the transducer in accordance with the second exemplary embodiment of the present invention.
Figure 4:
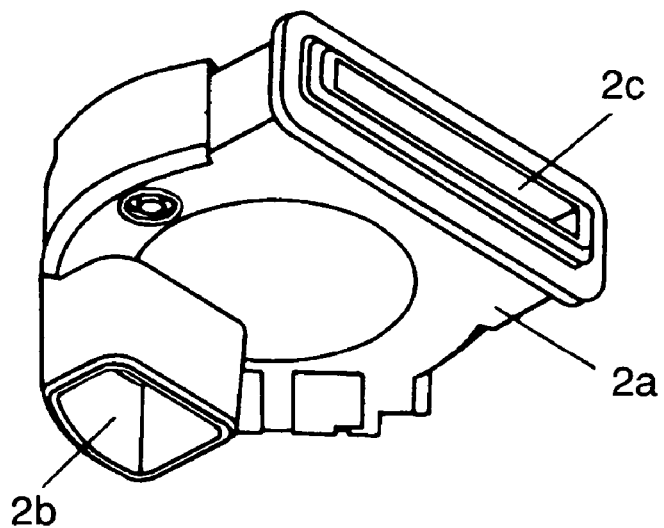

FIG. 4(a) is a side sectional view of a transducer in accordance with the second exemplary embodiment of the present invention. FIG. 4(b) is a perspective bottom view of the transducer. The second embodiment differs from the first one in the following points: First acoustic pipe 32b and second acoustic pipe 32c are unitarily formed (i.e., formed as one piece) with resin frame 32a in which a magnetic circuit is insert-molded. Both of the acoustic pipes are provided under diaphragm 33, so that the sound waves produced and radiated by the vibration of diaphragm 33 passing through tubes 32b and 32c are in-phase. First acoustic pipe 32b radiates the sound downward, and second acoustic pipe 32c radiates the sound in a side direction. Acoustic pipes 32b and 32c thus radiate the sound in two directions different from each other by 90 degrees. Since the sound waves radiated are in-phase, they do not interfere with each other and the sound pressure level can be increased.

Third Exemplary Embodiment

Figure 5C:
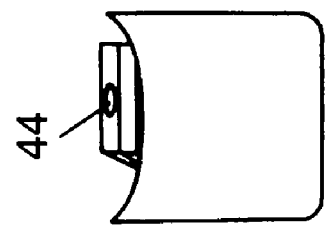
FIG. 5(c) is a front view illustrating a folded status of the portable telephone.
Figure 5B:
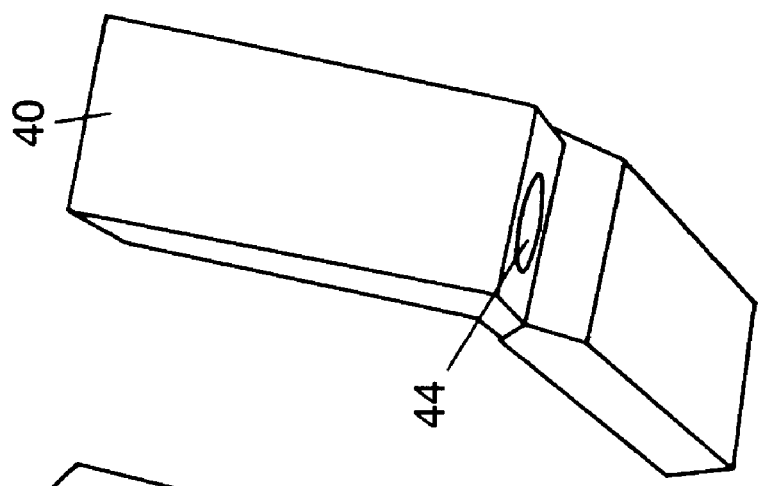
FIG. 5(b) is a perspective rear view of the same portable telephone.
Figure 5A:
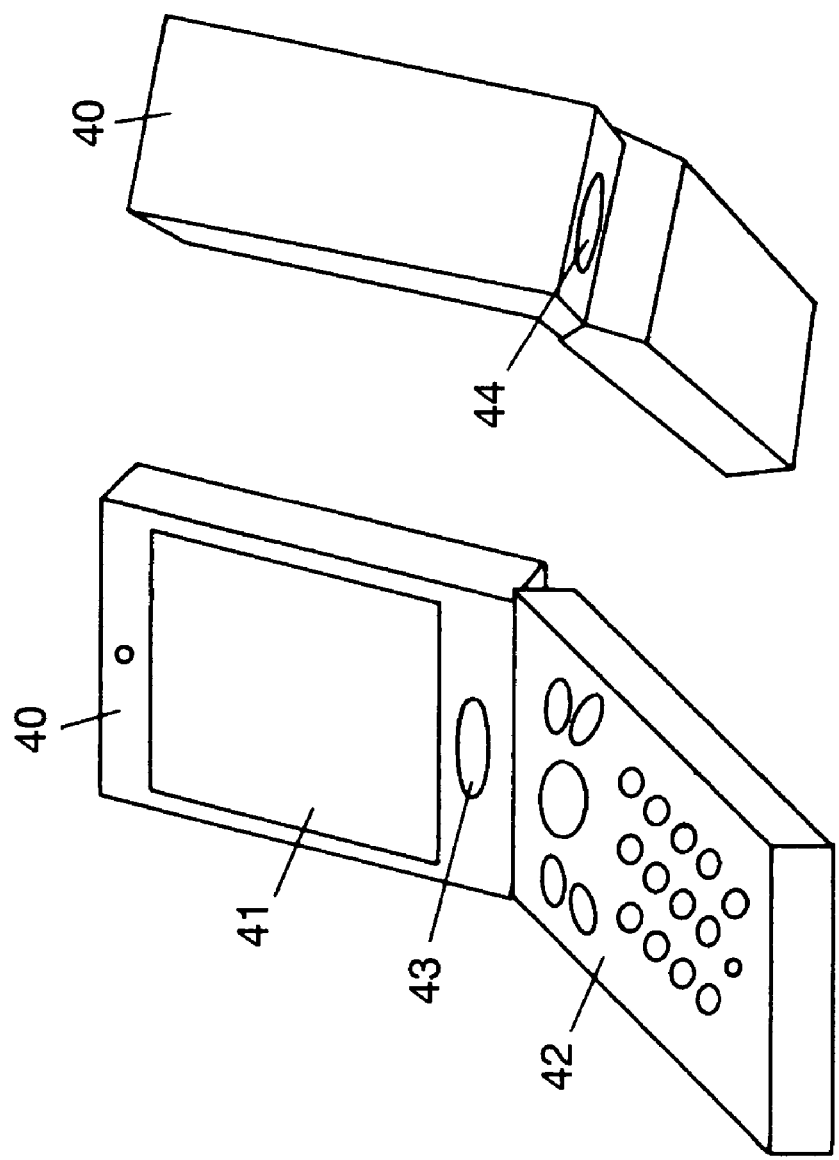
FIG. 5(a) is a perspective view of a portable telephone in accordance with the second exemplary embodiment of the present invention.

FIGS. 5(a) and 5(b) are perspective views of a folding type portable telephone using a transducer in accordance with the second exemplary embodiment of the present invention. FIG. 5(c) is a front view illustrating a folded status of the portable telephone in a user's pocket. Portable telephone 40 includes display section 41 for displaying input information and information obtained through a telephone communication, and operating section 42 through which a telephone number or the like is entered.

First opening 43 placed at a lower section of display section 41 is coupled to first acoustic pipe 32b of the transducer described in the second embodiment. Second opening 44 provided on a lower end face of display section 41 is coupled to second acoustic pipe 32c of the transducer.

Those connections between the first and second acoustic pipes of the transducer and the first and second openings of the portable telephone remain the same in the following embodiments and modifications, and the descriptions thereof are omitted hereinafter.

Since second opening 44 is provided at an end face of the portable telephone, a paging tone can be radiated from this end face when the phone is kept in the user's breast pocket as shown in FIG. 2(c). The user thus can notice a call with ease.

In the present embodiment, second opening 44 is provided at the lower end face. However, the opening can be provided at a side face. According to the present embodiment, there are less obstacles between the phone and the user's ear when the phone is kept in user's pocket as compared with the conventional portable telephone that has a sound radiating path of a transducer in the rear face of the phone. A user thus can notice a paging tone with ease. A situated status of the portable telephone in the user's pocket proposes that the second opening be provided at an upper end or a lower end of a rectangular portable telephone so that less obstacles between the phone and the user's ear can be expected.

In the present embodiment, when the portable telephone is folded over, first opening 43 provided at display section 41 is closed when a paging tone is delivered. Thus the sound pressure from second opening 44 increases, and a more remarkable paging tone can be delivered to a user. When a user opens the portable telephone for use, second opening 44 is closed with an end face of operating section 42, so that a sound pressure from first opening 43 can be increased.

Placement of the opening shown in FIG. 5(a) allows a user to accept the information displayed on display section 41 and the loud sound from opening 43 quite normally because both forms of information come from the same direction. The paging tone and the loud sound can be radiated by a single transducer, so that the transducer occupies a smaller space and contributes to downsizing the portable telephone.

FIG. 6(a) through FIG. 9(b) show examples modified from the present embodiment. Each one of the examples includes first openings 45, 47, 49 or 51 that delivers sound upward when the phone is in use, and second openings 46, 48, 50 or 52 that delivers sound from any one of an upper end face, a lower end face, and a side face when the phone is folded. This placement of the openings allows a user to notice a paging tone with ease when the phone is folded over. The arrangement also allows a user to accept sound normally from the first opening because the user hears the sound as if it comes from an operating section or a display toward the user.

Further, those examples use the transducer in accordance with the second embodiment, namely, first acoustic pipe 32b is coupled to the first opening and second acoustic pipe 32c is coupled to the second opening. This single transducer thus can deliver the sound in two directions, and contributes to downsizing the portable telephone.

Figure 6A:
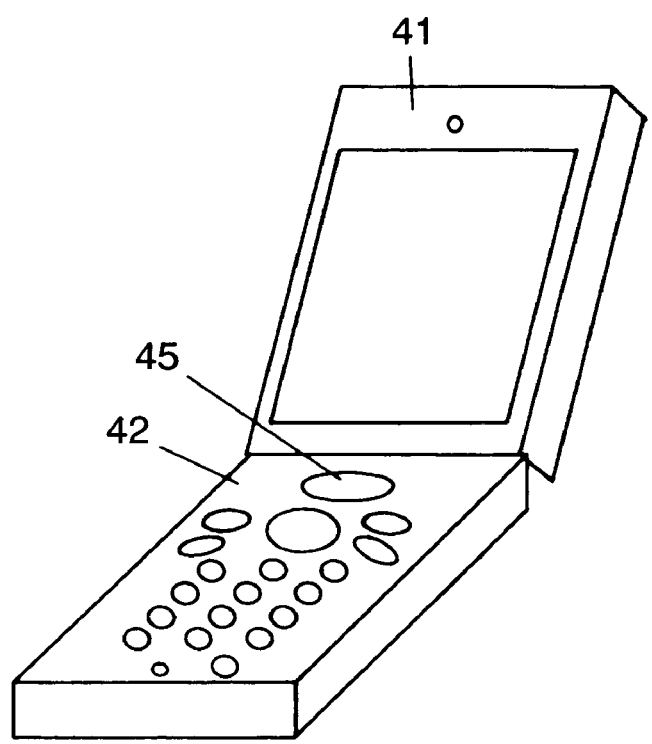
FIG. 6(a) is a perspective view of a modification of the second exemplary embodiment of the present invention.
Figure 6B:
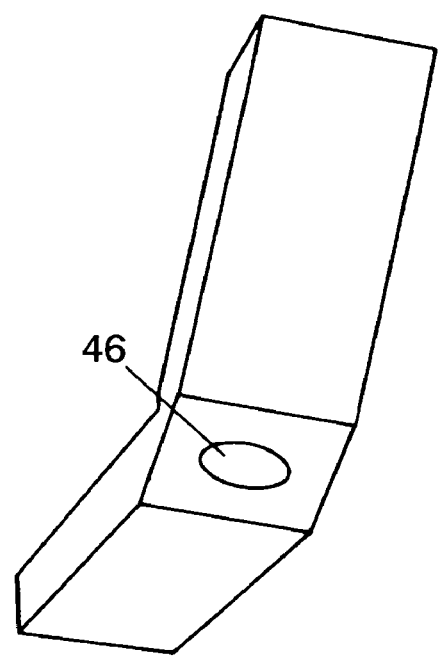
FIG. 6(b) is a perspective rear view of the modification.

FIGS. 6(a) and 6(b) show a folding type portable telephone in which first opening 45 is provided at an upper part of operating section 42 and second opening 46 is provided at an upper end face of operating section 42. When the phone is folded, first opening 45 is closed with operating section 42, so that a sound pressure of a paging tone delivered from second opening 46 is increased. Further, when the phone is in use, second opening 46 is closed with a lower end face of display section 41, so that a sound pressure of sound radiated from first opening 45 is increased.

Figure 7A:
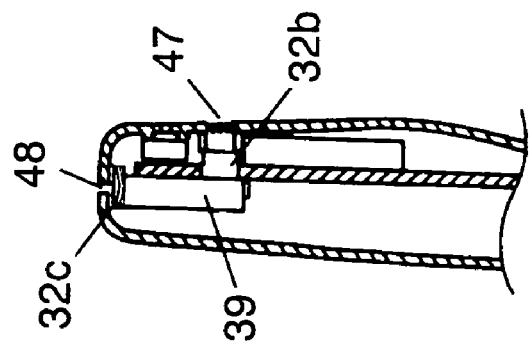
FIG. 7(a) is a perspective view of another modification.
Figure 7B:
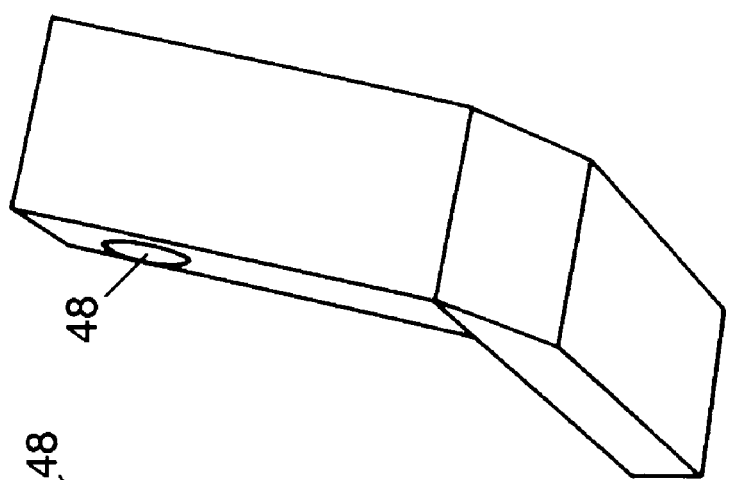
FIG. 7(b) is a perspective rear view of the same.

FIGS. 7(a) and 7(b) show a folding type portable telephone which includes first opening 47 on an upper section of display 41 and second opening 48 on a side face at an upper section. When the phone is folded, first opening 47 is closed by operating section 42, so that a sound pressure of a paging tone delivered from second opening 48 is increased. When the phone is in use, since the radiated sounds are in-phase, an output from second opening 48 passes in front of display 41, which virtually results in increasing the output sound pressure of first opening 47.

Figure 7C:
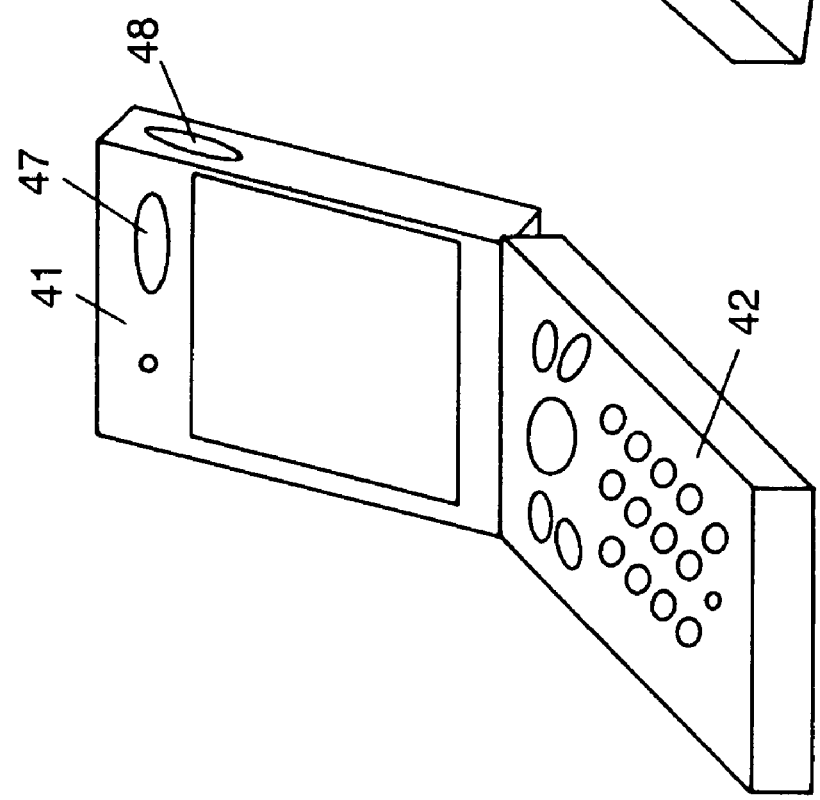
FIG. 7(c) is a sectional view of an essential part of the same.

FIGS. 7(a) and 7(b) show the folding type portable telephone. However, as shown in FIG. 7(c), a straight (not folding) portable telephone can have first opening 47 on an upper section of a display section and second opening 48 on a side face at a upper section or on an upper end face. This structure allows a single transducer to deliver a paging tone when the phone is kept in a user's pocket, and to radiate sound from a front face (i.e., a face where the display section is located), so that the portable telephone can be downsized. Similar to the modified example shown in FIGS. 7(a) and 7(b), the outputs from the first and the second openings are in-phase, so that a sound pressure of the output can increase. In the straight portable telephone, the first opening may be provided at a lower face of the operating section and the second opening can be provided at a lower side face or a lower end face. This structure produces the same advantage as what is discussed above.

Figure 8:
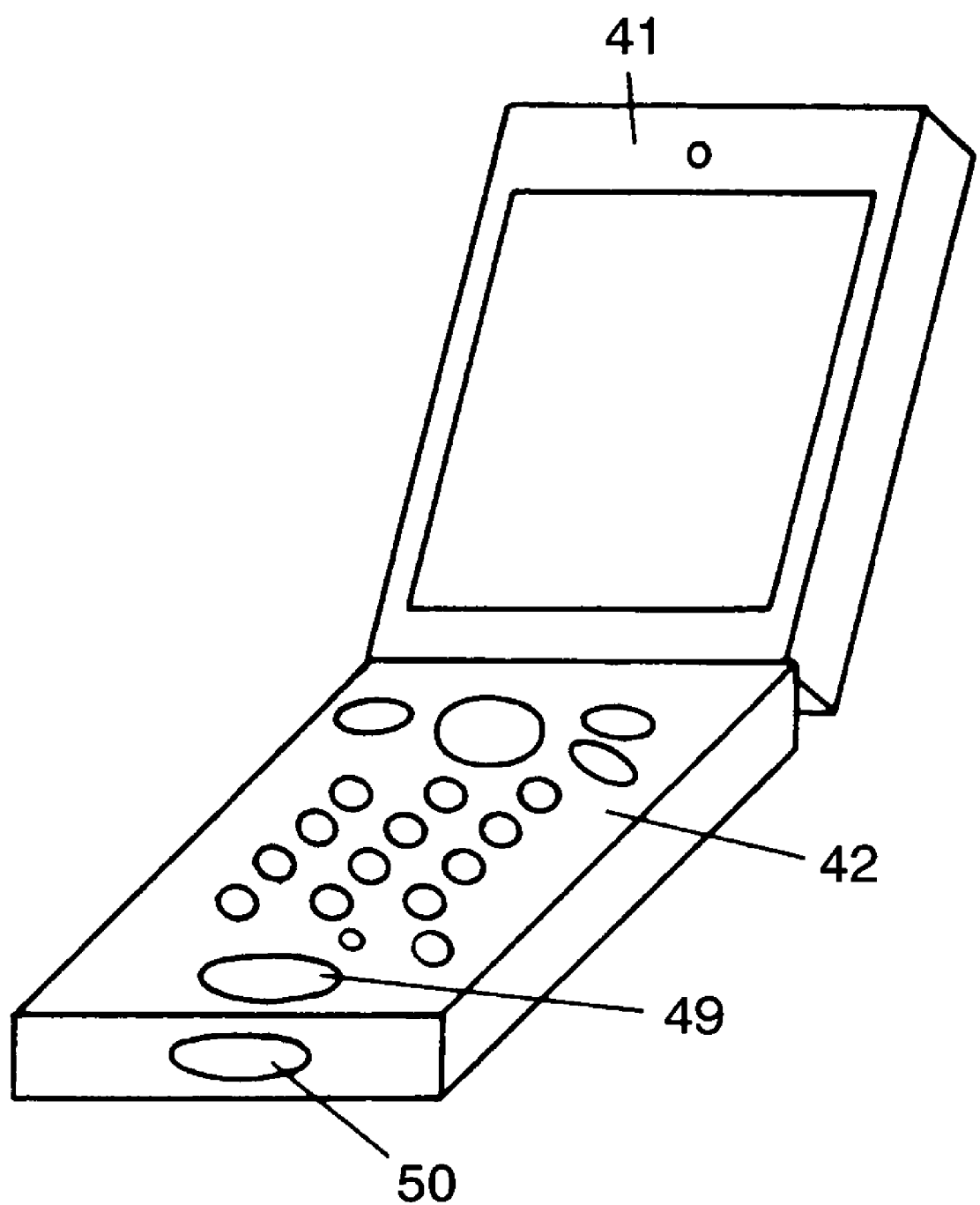
FIG. 8 is a perspective view of still another modification.
Figure 11A:
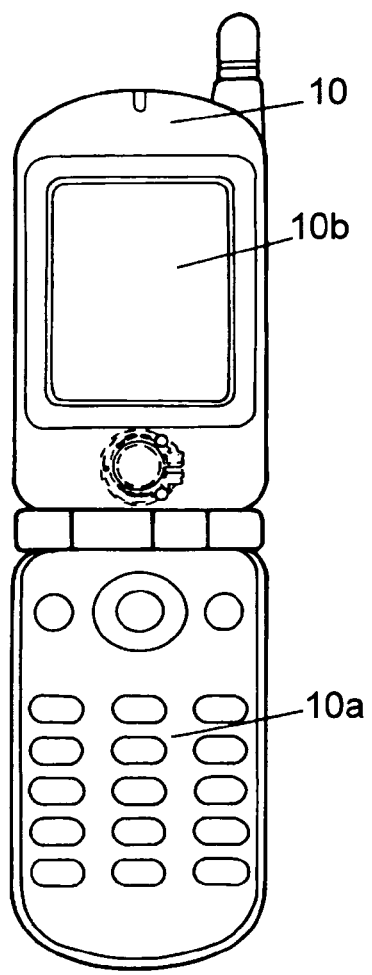
FIG. 11(a) is a front view of a conventional portable telephone in use.
Figure 11B:
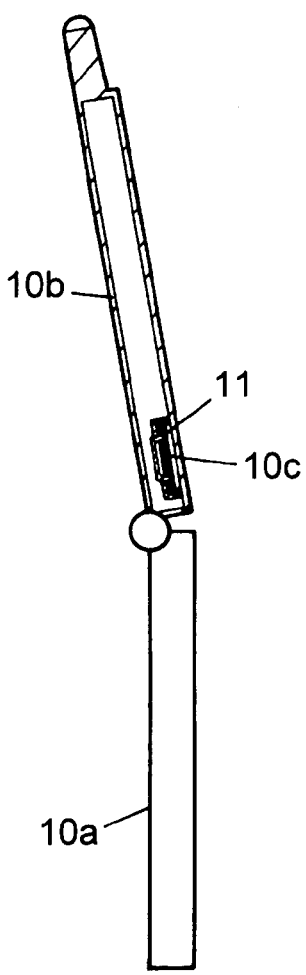
FIG. 11(b) is a side view with a half sectional view of the conventional portable telephone.
Figure 11C:
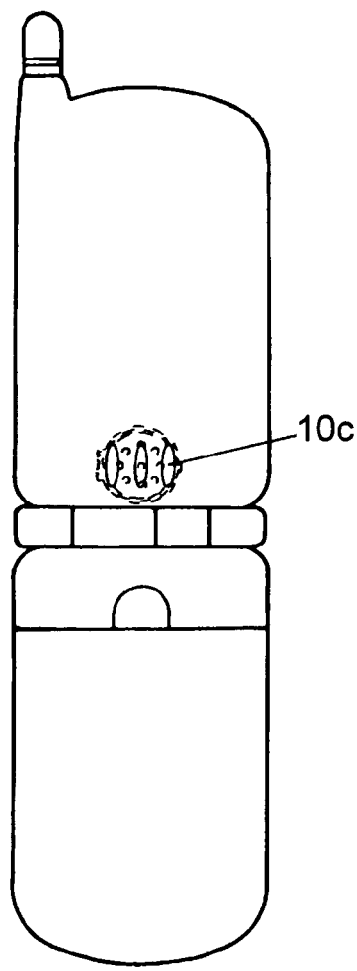
FIG. 11(c) is a rear view of the same.

FIG. 8 shows a folding type portable telephone which has a first opening 49 at a lower part of operating section 42 and second opening 50 on a lower end face of operating section 42. When the phone is folded, first opening 49 is closed by display section 41, so that a sound pressure of a paging tone delivered from second opening 50 increases. Further, when the phone is in use, an output from second opening 50 passes in front of display 41, which virtually results in increasing the sound pressure of an output from first opening 49.

FIGS. 9(a) and 9(b) show a folding portable telephone which has a first opening 51 at an upper part of operating section 42 and second opening 52 on a side face of operating section 42 at an upper part. When the phone is folded, first opening 51 is closed with display section 41 so that a sound pressure of a paging tone delivered from second opening 52 increases. Since sounds radiated when the phone is in use are in-phase, an output from second opening 52 passes in front of operating section 42, which virtually results in increasing the sound pressure of output from first opening 51.

FIG. 10 is a graph illustrating sound pressure level vs. frequency characteristics at display section 41. Curve X indicates the characteristics of the portable telephone shown in FIG. 5(a) in use. Second opening 44 is closed with the end face of operating section 42. Curve Y indicates the characteristics of the portable telephone shown in FIG. 7(a), and curve Z indicates the characteristics of a conventional portable telephone.

As FIG. 10 shows, it is confirmed that a structure having an opening disposed on a display section and another opening, with its open area closed, disposed on a side face when a phone is in use, radiates the highest sound pressure output. A structure having an opening on a side face and an output therefrom passing in front of a display, is next to the foregoing structure and better than the conventional one.

As discussed above, a plurality of acoustic pipes are formed in a frame of a transducer, and the acoustic pipes are provided on the same side of a diaphragm of the transducer. A use of this transducer in a portable telephone can increase an output sound pressure and downsize the portable telephone.

In the first through third embodiments, two acoustic pipes and two openings are used as examples. However, the number of acoustic pipes and openings of a communication terminal can be three or more depending on acoustic characteristics and other requirements. Then various modification can be developed, such as sound can be radiated from an operating section and both sides simultaneously.

Further in the previous descriptions, a dynamic transducer is used. However, not to mention, the present invention is not limited to the dynamic transducer, and it is applicable to a piezoelectric transducer. The piezoelectric transducer includes two types, one is to drive a piezoelectric ceramic member or a piezoelectric film directly with an electric signal, thereby producing sound, and the other one is to couple a piezoelectric ceramic member to a diaphragm for producing sound. A diaphragm using a piezoelectric film or a diaphragm coupled to a piezoelectric ceramic is fit to the present invention among others. A use of such a piezoelectric transducer advantageously decreases power consumption of the portable telephone.

INDUSTRIAL APPLICABILITY

A portable communication terminal and an electro-acoustic transducer to be used in the terminal of the present invention consumes less power, and yet radiates a greater output sound pressure with smaller bodies. The terminal in use delivers sound which virtually comes from a display section so that a user can accept the sound normally. A use of the portable communication terminal and its transducer thus produces great industrial advantage.

The invention claimed is:

1. A foldable portable communication terminal comprising:
   a housing having at least two openings; and
   an electro-acoustic transducer having at least two conduits, said at least two conduits comprising at least two openings or at least two acoustic pipes, said transducer being accommodated in said housing such that each of said conduits faces a respective one of said openings of said housing;
   wherein at least one of said openings of said housing is arranged so as to be outwardly open when said portable communication terminal is folded and so as to be closed when said portable communication terminal is unfolded for use.

2. A foldable portable communication terminal comprising:
   a housing including a display section and an operating section, said housing having at least two openings; and
   an electro-acoustic transducer accommodated in said housing, said transducer having at least two conduits arranged to radiate sound waves having the same phase, said at least two conduits comprising at least two openings or at least two acoustic pipes;
   wherein a first one of said openings of said housing is located on a main face of one of said display section and said operating section, and a second one of said openings of said housing is located on a side face adjacent to said main face of said one of said display section and said operating section; and
   wherein said openings of said housing are arranged so that each of said openings of said housing faces a respective one of said conduits of said transducer, and so that at least one of said openings of said housing is outwardly open when said portable communication terminal is folded and is closed when said portable communication terminal is unfolded for use.

3. The communication terminal of claim 2, wherein said at least two conduits of said transducer comprise at least two openings, said housing having an acoustic pipe unitarily formed therewith and arranged so as to be coupled to at least one of said openings of said transducer.

4. The communication terminal of claim 2, wherein said at least two conduits of said transducer comprise at least two acoustic pipes arranged such that an opening of each of said acoustic pipes is coupled to a respective one of said openings of said housing.

5. The communication terminal of claim 2, wherein said electro-acoustic transducer comprises one of a dynamic transducer and a piezoelectric transducer.

6. The communication terminal of claim 5, wherein said at least two conduits of said transducer comprise at least two acoustic pipes arranged such that an opening of each of said acoustic pipes is coupled to a respective one of said openings of said housing.

7. The communication terminal of claim 2, wherein said transducer includes a frame and a cover joined to an entire periphery of said frame, said acoustic pipes being connected to one of said frame and said cover.

* * * * *